United States Patent [19]
Schloss

[11] Patent Number: 5,824,196
[45] Date of Patent: Oct. 20, 1998

[54] DECONTAMINATION OF RPET BY STEAM DISTILLATION

[75] Inventor: Francis M. Schloss, Perrysburg, Ohio

[73] Assignee: Plastic Technologies, Inc., Holland, Ohio

[21] Appl. No.: 629,166

[22] Filed: Apr. 8, 1996

[51] Int. Cl.$^6$ .............................. B01D 3/38; C08J 11/14
[52] U.S. Cl. ............... 203/95; 159/16.3; 159/DIG. 10; 203/92; 203/96; 209/11; 209/12.1; 521/45; 521/48
[58] Field of Search .................. 203/92, 4, 95–96; 159/47.1, 16.3, DIG. 10; 521/40, 45, 48; 528/308.2; 209/3, 11, 12.1; 134/7, 30, 34

[56] References Cited

U.S. PATENT DOCUMENTS

| | | | |
|---|---|---|---|
| 4,591,629 | 5/1986 | El-Ghatta et al. | 528/308.2 |
| 4,602,046 | 7/1986 | Buser et al. | 521/46 |
| 5,110,055 | 5/1992 | Teeny | 241/15 |
| 5,120,768 | 6/1992 | Sisson | 521/46.5 |
| 5,252,614 | 10/1993 | Sisson | 521/46.5 |
| 5,335,786 | 8/1994 | Roberto | 209/3 |
| 5,395,858 | 3/1995 | Schwartz, Jr. | 521/48 |
| 5,443,652 | 8/1995 | Scarola et al. | 134/7 |
| 5,473,102 | 12/1995 | Johnson et al. | 562/483 |

FOREIGN PATENT DOCUMENTS 0492043  7/1992  European Pat. Off. .

OTHER PUBLICATIONS

Laboratories in Organic Chemistry, 6th Edition, by Adams, Johnson & Wilcox "Steam Distillation," pp. 60–66, 1970, Macmillan.

Introduction to Modern Experimental Organic Chemistry, by Roberts, Gilbert, Rodewald and Wingrove "2.6 Steam Distillation," pp. 29–33, 1969 Holt, Rinehart & Winston, Inc.

*Primary Examiner*—Virginia Manoharan
*Attorney, Agent, or Firm*—Donald R. Fraser

[57] ABSTRACT

Organic contaminants are removed from RPET flakes by a process that includes steam-stripping the contaminants out from the matrix of the RPET flakes. In an alternative embodiment, the RPET flakes are first comminuted to prepare RPET particles, and the RPET particles are thereafter steam-stripped.

1 Claim, No Drawings

DECONTAMINATION OF RPET BY STEAM DISTILLATION

FIELD OF THE INVENTION

This invention relates generally to an improved process for decontaminating recycled polyethylene terephthalate (RPET) by subjecting same to steam distillation. More particularly, the invention is directed to a process for removing contaminants which have diffused into the matrix of the sidewalls of a PET container, which process is conducted after the container is recycled into RPET.

BACKGROUND OF THE INVENTION

Post-consumer processing of recycled PET to manufacture a variety of useful consumer products such as fibers, carpet and strapping material is well known. Typically, the recycling process utilizes used PET containers, such as discarded carbonated beverage containers, which are collected, sorted, washed, and separated from physical contaminants to yield a relatively clean source of RPET. Additionally, the manufacture of molded PET products, particularly the blow molded bottles for use in containing consumer goods, results in a considerable amount of PET waste which the manufacturer of such products would like to reuse. The RPET produced by conventional recycling processes is generally in ground or flake form, which is thereafter melt-processed or further pelletized by the end user.

RPET is always subjected to a grinding operation in order to make the material easier to handle and process. Conventional grinding equipment reduces the RPET to about ⅜ inch particles or flakes. The grinding is carried out in a manner to insure that a consistent flake size will be produced, by employing a grate or screen through which the ground material must pass upon exiting the grinder. Although conventional RPET flake melt-processing and pelletizing equipment is designed to handle ⅜ inch flakes, some RPET materials having sizes as large as ½ inch and as small as ¼ inch are also commercially produced.

The critical aspect for achieving consistently high quality end products utilizing RPET is comprehensive decontamination of the RPET flakes or pellets. Significant decontamination occurs during the washing and sorting of PET scrap. The incoming PET bottles and containers are comminuted to form PET fragments and to remove loose labels, dirt, and other adhered foreign particles. Thereafter, the mixture is air classified and the remaining fragments are washed in a hot detergent solution to remove additional label fragments and adhesives from the PET fragments. The washed PET fragments are then rinsed and placed in a series of flotation baths where lighter weight particles are removed. The remaining PET fragments are then dried and sold as RPET flakes. Thus, label and basecup glues, polyolefins, PVC, paper, glass, and metals, all of which adversely affect the quality and performance of the finished product, are removed from the PET.

Of recent concern are the toxic contaminants which may be introduced into a typical RPET processing stream. Examples of such contaminants include pesticides, solvents, herbicides, chlorinated hydrocarbons, and the like, which could contaminate the RPET through incidental, inadvertent contact during processing or transporting same, or by the recycling of PET bottles and containers which were used by consumers to hold toxic substances for some extended period of time. D. W. Hayward, "Employing RPET in Your Process," SPE RETEC, Nov. 4, 1994 reports that "clean" RPET flakes can still contain residual contaminants in concentrations as high as 4%, and there is a likelihood that such contaminants would include toxic contaminants. These sources of contamination are appropriately of great concern to those who desire to incorporate RPET into new containers for food-contact use.

With regard to the possibility that toxic contaminants could be contained in RPET designated for food-contact use, the FDA has set protocols for the levels of such contaminants in these applications, and has suggested surrogates and concentration limits to establish the effectiveness of washing and subsequent decontamination processes. Because the FDA protocols require that the RPET be introduced to the selected contaminant for as long as two weeks. it is clear that the contaminant will have diffused into the polymer matrix of the bottle or container sidewall. Accordingly, an effective decontamination method will to some extent require that the contaminant be driven back out of the RPET flakes produced from the bottle or container sidewalls, in order to meet the required contaminant concentration limit.

It would be desirable to develop a process for decontaminating RPET flakes to produce "clean" RPET flakes, wherein the clean RPET flakes would exhibit a residual contaminant level which would make it acceptable for manufacturing new food-grade PET bottles and containers.

SUMMARY OF THE INVENTION

Accordant with the present invention, a process for removing contaminants from RPET flakes has surprisingly been discovered. The process comprises the steps of: providing a plurality of RPET flakes; and contacting the RPET flakes with steam, to steam-strip the contaminant from the RPET flakes.

In an alternative embodiment, the process for removing contaminants from RPET flakes comprises the steps of: providing a plurality of RPET flakes; comminuting the RPET flakes, to prepare a plurality of RPET particles; and contacting the RPET particles with steam, to steam-strip the contaminant from the RPET particles.

The inventive process is particularly useful for removing toxic contaminants from RPET flakes, so that the resultant "clean" RPET flakes may be utilized to manufacture new food-grade PET bottles and containers.

Further objects and advantages of this invention will be apparent from the following description and appended claims, reference being made to the accompanying drawings forming a part of the specification, wherein like reference characters designate corresponding parts in the several views.

DETAILED DESCRIPTION OF THE PREFERRED EMBODIMENTS

The present invention is directed to a process for removing contaminants from RPET flakes. The RPET flakes are subjected to steam distillation or steam stripped, to remove the contaminants which have diffused into the RPET matrix. In a preferred embodiment, the RPET flakes are first comminuted to form RPET particles, and the RPET particles are then steam-stripped.

By the term "RPET flakes" as it is used herein is meant generally the commercially available recycled polyethylene terephthalate materials produced by conventional PET recycling methods; usually supplied in flake form, but which may alternatively be in the form of chunks, spheres, pellets, and the like, and which generally are made available in bulk in a substantially uniform particle size from about ¼ inch to about ½ inch for subsequent melt-processing operations.

A typical single ⅜ inch RPET flake exhibits a surface-to-volume ratio of about 177. Contaminants which have penetrated the RPET flake matrix can only diffuse out of the flake at its surface. Contaminants which have diffused far into the RPET flake matrix generally cannot diffuse back out of the flake between the time the RPET flake is produced by the conventional PET recycling process and the time the RPET flake is utilized in a subsequent melt-processing operation for producing a new PET article. The commercial washing and cleaning operations in use today throughout the industry for producing RPET flakes are not aggressive enough to remove toxic contaminants which have diffused into the discarded PET bottles and containers and which are still contained within the RPET flakes. Conventional methods for eliminating toxic contaminants from RPET flakes generally include degrading the polymer to free it of contaminants, then repolymerizing the PET to make it suitable for bottle or container manufacturing. Other elaborate methods include devolatilization through vacuum extrosion, or other high heat long residence time processing steps.

Accordant to the present invention, a plurality of RPET flakes is selected for decontamination. The flakes are then contacted with steam in order to steam distill or steam-strip the contaminants out from the matrix of the selected RPET flakes. For immiscible materials, the total pressure of a mixture is equal to the sum of the partial pressures of each of the component gases. Since the total pressure of the mixture is greater than the pressure of any one of the components, the boiling point of the mixture will always be lower than the boiling point of the lowest boiling component. Because most organic materials, such as the toxic contaminants contemplated in the present invention, have molecular weights significantly greater than water and vapor pressures that are much less than water, more organic material than water (on a weight basis) will typically be removed by steam-stripping.

In operation, the selected RPET flakes may be steam-stripped by any conventional method used for steam distillation. A preferred method involves in-situ generation of the steam, simply by immersing the RPET flakes into water which is maintained at a boiling temperature. Thus, only a small amount of steam is generated to effect the steam-stripping process. Alternatively, steam generated at a remote location may be injected into a bed of RPET flakes, or into a mass of RPET flakes contained in a vessel partially filled with water. In the case where steam is generated separately and injected into the RPET flakes, the temperature of the steam may vary over wide limits from about 100° C. to about 220° C. Preferably, the steam temperature ranges from about 150° C. to about 190° C. In the case where steam is generated in-situ, the temperature at which the steam is generated may also vary over wide limits, depending upon the pressure at which the system is maintained, but is conveniently within the range from about 100° C. to about 190° C.

Following the steam-stripping operation, the decontaminated RPET flakes generally are removed from the stripping atmosphere, thoroughly dried, and made available for melt-processing operations to produce new PET bottles or containers.

The steam-stripping step according to the present invention removes contaminants which have sorbed onto the surfaces of the RPET flakes as well as partial removal of those contaminants that have diffused into the matrix of the RPET particles. The elevated temperatures at which the steam-stripping is conducted facilitate the permeation of the contaminants from the interior toward the surfaces of the RPET flakes, in order to reestablish the contaminant surface concentration equilibrium that is disrupted by the removal of contaminant molecules from the surfaces during the steam-stripping process. Thus, steam-stripping removes a significantly greater amount of organic contaminants from RPET flakes than can be achieved merely by washing the flakes in hot water or heating the flakes in the absence of water.

For those organic contaminants which are soluble in water, the steam-stripping process will be less effective. However, such materials will frequently exhibit azeotropic behavior with water, and thus will also be removed by steam-stripping. An example of such an azeotrope is ethanol and water.

In an alternative embodiment of the process of the present invention, the RPET flakes are first comminuted to prepare RPET particles which are thereafter steam-stripped. Because organic contaminants can diffuse out from small particles of RPET material more quickly than from larger RPET flakes, the amount of time required to steam-strip the RPET particles is less than that otherwise required to steam-strip the RPET flakes from which the particles are produced.

According to the alternative embodiment of the present invention, the RPET flakes may be comminuted by any conventional means to prepare RPET particles typically having an average mean particle size from about 0.005 inch to about 0.05 inch in diameter. However, it should be noted that this present invention will still be effective at steam stripping contaminants from RPET particles having an average mean particle size less than 0.005 inch. This is a significant reduction in the size of a typical RPET flake which generally ranges from about ½ inch to about ¼ inch in diameter. The RPET particles so produced may then be steam-stripped by the same methods as those listed above for steam-stripping RPET flakes.

The process for removing contaminants from RPET flakes according to the present invention removes substantially more of the contaminants from the flakes than does the normal RPET wash and clean processes currently used. That is, the decontaminated RPET flakes so produced can exhibit a contaminant concentration level low enough to be suitable for the preparation of food-contact bottles and containers.

The process for removing contaminants from RPET flakes described hereinabove is generally disclosed in terms of its broadest application to the practice of the present invention. Occasionally, however, the process conditions as described may not be precisely applicable to each contaminant/RPET flake combination included within the disclosed scope. Those instances where this occurs will be readily recognized by those ordinarily skilled in the art. In all such cases, the process may successfully be performed by routine modifications to the disclosed process, e.g., the use of higher temperature steam to effect the steam-stripping, or other modifications which are otherwise conventional may be employed.

The invention is more easily comprehended by reference to the specific embodiments recited hereinabove which are representative of the invention. It must be understood, however, that the specific embodiments are provided only for the purpose of illustration, and that the invention may be practiced otherwise than as specifically illustrated without departing from its spirit and scope.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A process for removing a contaminant from recycled polyethylene terepthalate (RPET) flakes, comprising the steps of:

providing a plurality of RPET flakes having a contaminant diffused thereinto;

comminuting the RPET flakes, to prepare a plurality of RPET particles having an average mean particle size from about 0.005 inch to about 0.05 inch in diameter; and contacting the RPET particles with steam by immersing the RPET particles in water that is maintained at a boiling temperature from about 100° C. to about 190° C., to steam-strip and cause to diffuse out substantially all of the contaminant from the RPET particles.

* * * * *